Jan. 21, 1947.  R. R. BIRCHFIELD  2,414,687
BRAKE SHOE
Original Filed Jan. 12, 1944

*R. R. Birchfield*
INVENTOR.

BY *CA Snowles*
ATTORNEYS.

Patented Jan. 21, 1947

2,414,687

UNITED STATES PATENT OFFICE 2,414,687

BRAKE SHOE

Roy R. Birchfield, Shreveport, La.

Original application January 12, 1944, Serial No. 518,006. Divided and this application November 9, 1944, Serial No. 562,626

1 Claim. (Cl. 188—250)

The device forming the subject matter of this application is a brake shoe. The present application discloses an invention divided out of my former application for Letters Patent on a Hydraulic brake, Serial Number 518,006, filed January 12, 1944 and issued as Patent No. 2,389,405 on Nov. 20, 1945.

The invention aims to provide a brake shoe having a lining of novel form, a carrier of novel form for the lining, and novel means for assembling the lining with the carrier.

Within the scope of what is claimed, changes in the embodiment of the invention herein disclosed may be made without departing from the spirit of the invention.

Figure 1:
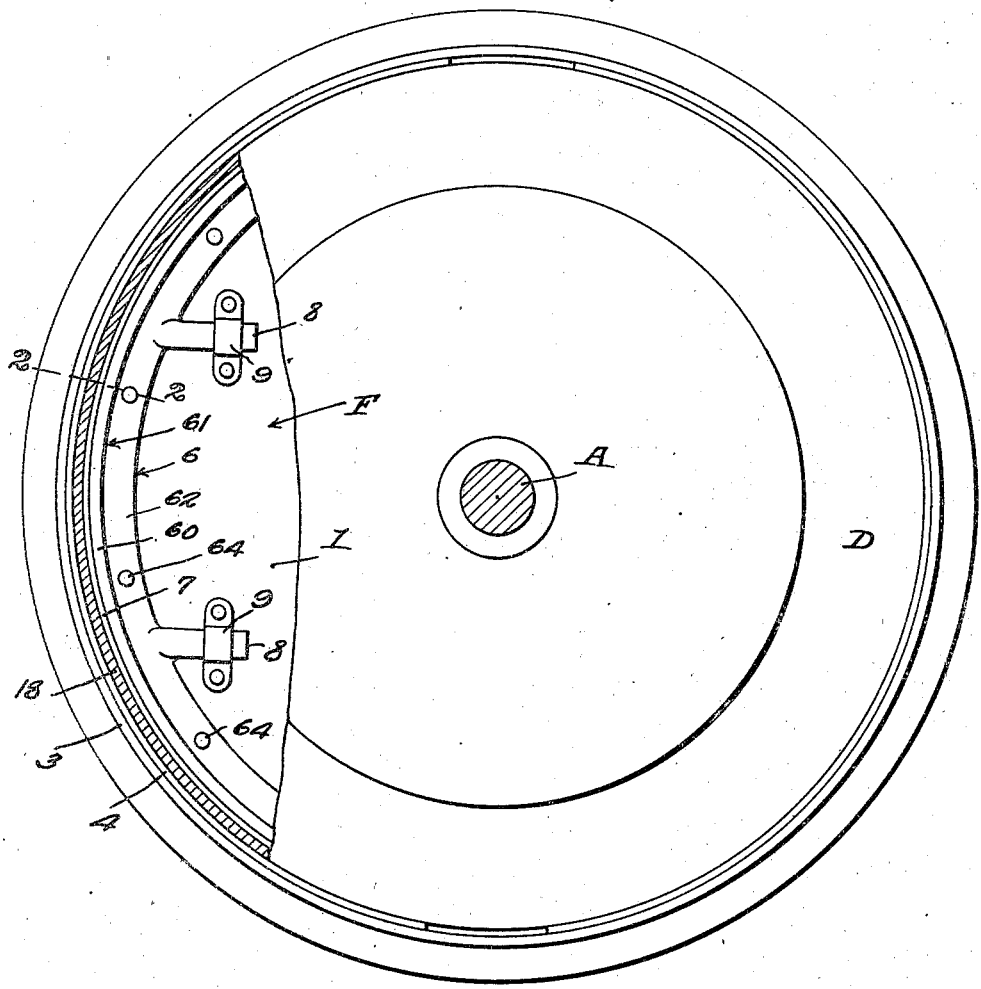
Figure 1 shows, in side elevation, a device wherein the present invention has been incorporated.

The letter F designates a fixed drum. The fixed drum F includes a back plate 1. The back plate 1 is adapted to be secured fixedly, by any appropriate means (not shown) to any accessible part of a vehicle. The back plate 1 is provided at its periphery with a laterally projecting annular flange 3. The numeral 6 designates the brake shoe.

The brake shoe 6 comprises oppositely disposed angle members 61, including transverse flanges 60, and inwardly projecting flanges 62. On the outer surfaces of the flanges 60 is disposed a lining 7, having inwardly extended tongues 63, disposed between the flanges 62 of the shoe 6. Securing elements 64, such as rivets, connect the flanges 62 and bind the tongues 63 between them. The linings 7 and their tongues 63 may be formed by folding a piece of material as shown in Figure 2.

A lining 4 is secured to the inner surface of the flange 3 on the back plate 1. A drum D is secured to the wheel of a vehicle (not shown). The drum D includes a lateral flange 18, received between the linings 7 and 4. The flange 3 and the lining 4 form a dust guard.

My application hereinbefore identified shows that the brake shoe 6 may be made in two semicircular parts. Each part of the brake shoe 6 has inwardly projecting fingers 8. The fingers 8 are slidably received in keepers 9, secured to the back plate 1 from the fixed drum F. The drum D is carried by an axle A passing rotatably through the fixed drum F. Any suitable means may be provided for expanding the brake shoe 6. The expanding means forms no part of the present application.

Figure 2:
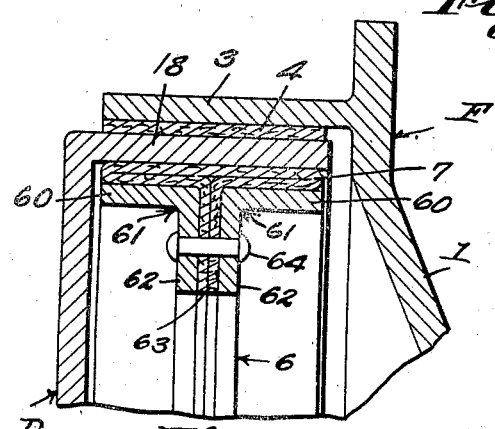
Figure 2 is a section on line 2—2 of Figure 1.

The brake shoe structure depicted in Figure 2 of the drawing is simple, durable, inexpensive and effective.

What is claimed:

A brake shoe comprising opposed angle members having inwardly extended flanges and laterally arcuate flanges, the arcuate flanges on the two members being extended in opposite directions, and a lining of strip material having inwardly directed side folds cooperating with the intermediate portion of the strip material to form a lining of double thickness supported on the arcuate flanges and of a width equal to the combined width of said flanges, the marginal portions of the strip being parallel and cooperating to provide a continuous longitudinal tongue extending between the inwardly extending flanges on the angle member, and means extending through said inwardly extended flanges and the tongue portion of the strip for binding the same together.

ROY R. BIRCHFIELD.